United States Patent Office 3,443,640
Patented May 13, 1969

3,443,640
METHOD OF REDUCING THE PERMEABILITY OF A SUBSURFACE STRATUM
Frederick A. Klein, Bartlesville, Okla., assignor to Phillips Petroleum Company, a corporation of Delaware
No Drawing. Filed June 5, 1967, Ser. No. 643,354
Int. Cl. E21b *33/138, 43/25*
U.S. Cl. 166—294                                          4 Claims

ABSTRACT OF THE DISCLOSURE

Selective plugging of a subsurface formation wherein an aqueous slug comprising minute solid particles in suspension and a dispersing surfactant in solution, the slug having a predetermined degree of stability, is injected and driven into the formation, desorbing the surfactant to the extent that the minute solids are precipitated from the suspension and deposit in the formation.

---

This invention relates to a method of reducing the permeability of a subsurface stratum. In one aspect, the invention relates to completely plugging a thief zone in a subsurface formation.

In the drilling of wells and during the production of oil from a subsurface stratum, including secondary recovery operations, it may be desirable at times to seal off sections of the stratum or reduce the permeability thereof. In secondary recovery methods utilizing fluid drive, the tendency of the sweeping fluid to channel through the more permeable sections of the stratum, this being known as "fingering," is particularly detrimental since oil is not recovered from the bypassed sections of the formation. In other instances, highly permeable and porous "thief" zones in the stratum effectively divert flow of the driving fluid. Gas or water encroachment or "coning" around a well bore from a subadjacent level often greatly reduces or prevents oil production.

There are several methods of reducing the permeability or selectively plugging a formation which have been proposed in the prior art. One method utilizes minute solids suspended in an aqueous slug which are precipitated from the suspension upon contact with brine or salt water to plug the formation.

The invention effects a reduction in permeability of a permeable stratum in varying degrees, up to and including the complete plugging of a section of the stratum with minute solids without relying upon salt water contact to precipitate the solids from suspension.

Accordingly it is an object of the invention to provide an improved method of reducing the permeability of a subsurface stratum.

Another object of the invention is to reduce fingering during a fluid drive secondary recovery operation.

Another object of the invention is to minimize undesirable fluid encroachment in a producing well.

These and other objects will be apparent to one skilled in the art upon consideration of the specification and appended claims.

According to the invention, there is provided a method of reducing the permeability of a subsurface stratum comprising injecting an aqueous slug containing in suspension, solid particles in the size range of 0.001 to 1 micron selected from the group consisting of carbon black, kaolin and talc and, in solution, a surfactant for dispersing the particles, and driving the suspended solids slug into the stratum with a driving medium until the surfactant is adsorbed on the stratum to such an extent that a substantial portion of the particles precipitate from the suspension and deposit out in the stratum. The solid particles are present in the aqueous slug in an amount in the range of 0.05 to 2 weight percent and the surfactant is added to the slug in an amount in the range of 0.001 to 2 weight percent. The surfactant to particle weight ratio is controlled within a range which gives a desired degree of stability to the suspension. By controlling the degree of suspension stability it is possible to control the depth to which the slug penetrates through the stratum before it becomes unstable to the extent that particle precipitation results.

Further in accordance with the invention, prior to injecting the particle suspension slug, an aqueous slug of surfactant is injected to precoat the pore walls of the stratum to a desired depth and/or horizontal distance from the well. Precoating to a desired extent prevents desorption of the surfactant from the particle onto the stratum as the particles pass through to the treated section of the stratum. Upon contact with the untreated section of the stratum, adsorption of the dispersing surfactant by the stratum begins and the stability of the suspension is reduced. When a sufficient quantity of the surfactant has been adsorbed by the stratum (desorbed from the particles) precipitation and plugging occur.

In one embodiment of the invention, the particle suspension slug is made with oil field brine or produced salt water, minute particles and the surfactant. This allows the use of an aqueous medium which is readily available.

Any of the known surface active agents which act as dispersants for solids in aqueous media can be used in the solids suspension slug of the invention. A number of surfactants which are water soluble are readily available from commercial sources. Hydrophilic (or lyophilic) agents attracted to the water phase are most desirably employed. Exemplary non-ionic agents are those obtained by the reaction of a hydrophobic hydroxy compound such as a phenol or alcohol with several mols of an alkylene oxide, principally ethylene oxide or propylene oxide. Similarly, alkylene oxide reaction products of the higher fatty acids as well as fatty acid esters of anhydrosorbitals can be used. Other suitable surface-active dispersing agents include phosphoric acid esters of polyethylene glycol; low order condensation products of alkylene oxide with esters of polyhydric alcohols and polybasic soluble acids, such as glycol tartarte and glycerol stearate, further esterified with stearic acid; and alkylene oxide condensation products of higher fatty acid reaction products with alkylo amines, such as coconut fatty acids with diethanol amine.

Non-ionic polyoxide ethers or thioethers, having an average ethylene oxide chain length at the hydrophilic end in the range of 3 to 100 mols with a single terminal hydroxyl group, are the preferred surfactants used in the practice of the invention. Nonylphenoxy polyethanols, having an average of 30 to 100 ethoxy groups per molecule, are especially effective in forming stable suspensions of carbon black particles in brine solutions. The use of the nonylphenoxy polyethanol also allows the use of salt-containing fluids such as produced brine, to drive the slug into the stratum without premature precipitation of the solid particles.

When it is desired to precoat or pretreat the formation to a certain depth, the precoat slug can be injected and driven to the depth desired in the stratum by any suitable driving media. If desired, the precoat slug can be injected with the solids suspension slug being injected immediately after so as to drive the precoat slug ahead. The driving media used to force the slugs into the stratum can comprise any suitable fluid for example steam and/or water.

The above-mentioned surfactants have been described as being used to disperse the minute solids in the slug of suspended particles but can also be used in an initial slug to precoat the formation. The quantity of surfactant necessary to precoat the interstitial surfaces of the stratum and hence the concentration of the surfactant in, and the pore volume of, the precoat slug to be injected, will depend upon the stratum volume to be treated, the type of stratum and the particular surfactant used.

Other surface-active agents, which do not have the solids dispersing characteristic, but do prevent or minimize adsorption of the dispersing surfactant by the stratum, can be used to precoat the stratum. Exemplary of this class of surfactants are the alkylaryl sulfonates, polyvinyl alcohol resins, and low molecular weight petroleum sulfonates. The use of less expensive surfactants of this class can considerably improve the economics of plugging deep within a stratum.

The following examples will further illustrate the invention.

EXAMPLE I

It was assumed that it is desired to plug the stratum immediately adjacent to a well bore, such as would be done to prevent water encroachment in the bottom of a well. In this type of application a nearly unstable suspension would be used. To determine the ratio of surfactant to solids necessary to obtain this desired degree of stability, settling tests were run. A simulated brine, containing 40 grams of sodium chloride, 10.5 grams of calcium chloride, and 4.8 grams of magnesium chloride having 6 mols of hydration per liter of water, was used as the aqueous component of the suspension slug. Igepal VO-990, a tradename of Antara Chemical Division of General Aniline and Film Corporation, further identified as n-phenoxypolyethanol having an average chain length on the hydrophilic end in the range of 95 to 100 mols or units of ethylene oxide, was used as the surface active dispersant for the solid particles. Philblack I (a trademark of Phillips Petroleum Company), a furnace black, was used as the particulate solid, illustrative of other solids. The suspensions, containing various amounts of carbon black and surfactant, were stirred in a high speed blender for approximately 30 minutes. The samples were then allowed to stand undisturbed, and the amount of carbon black remaining in suspension was measured at various time intervals. The results of the stability tests are tabulated below:

TABLE

| Suspension No. | CO-990 to carbon black ratio, gm./gm. | Carbon concentration in suspension, wt. percent | | | |
|---|---|---|---|---|---|
| | | Initial carbon black | 2 hrs. | 24 hrs. | 96 hrs. |
| 1 | 0.300 | 1.2 | | 1.2 | 1.1 |
| 2 | 0.262 | 0.8 | | 0.67 | |
| 3 | 0.225 | 0.8 | 0.2 | | |
| 4 | 0.150 | Unstable | | | |

These data show that a surfactant to carbon black ratio of about 0.25:1 to 0.3:1 gives a suspension of marginal stability. This suspension would become unstable upon contact with the formation and desorption of a small amount of the surfactant and would be used to plug a section of formation adjacent to a bore hole.

EXAMPLE II

The utility of the suspension as a plugging agent was verified by tube displacement tests. The tests were performed using 6-foot-long, ¾-inch inner diameter clear plastic tubes packed with sand from the Burbank field in Osage and Kay Counties, Okla. The packed tubes were flooded with Burbank crude oil and then flooded with the brine solution described in Example I until a water/oil ratio of 50 was attained in the produced fluid. At this stage of the tests, the tubes simulated a highly permeable thief zone such as might be encountered in a stratum subadjacent to an oil reservoir.

In one test, a carbon black-surfactant suspension, of 0.24 weight percent Igepal CO-990 and 0.8 weight percent Philblack I in the brine solution, having a surfactant to carbon black weight ratio of 0.3 to 1, was introduced into a packed tube which had a pore volume of 172 cc., an oil saturation of 29 percent and a water (brine) saturation of 71 percent. Upon injection of the near-unstable carbon black suspension there was an immediate and increasing reduction in the permeability of the sand pack. After injecting 219 cc. of the suspension (1.3 pore volumes) the zone of carbon deposition had advanced only 9 inches into the 6-foot-long tube. Severe plugging had occurred and permeability had decreased by approximately 95 percent. The test was terminated at this point due to high injection pressures.

This test showed that by selecting the surfactant to solids weight ratio which gives a desired degree of stability, the deposition of solids can be controlled to effectively plug a formation.

It was found in subsequent tests that the point of plugging within the 6 foot long sand pack could be controlled by injecting a sufficient amount of Igepal CO-990 surfactant in brine solution ahead of the carbon black suspension to saturate the sand grain surfaces with surfactant. Under these conditions the amount of surfactant necessary to coat the sand pack and prevent precipitation was determined to be about 1.8 milligrams per gram of sand.

Reasonable modification and variation are within the scope of this invention which sets forth a novel method of decreasing the permeability of a subsurface stratum.

That which is claimed is:

1. A method of reducing the permeability of a subsurface stratum comprising:
   injecting into a selected area of said stratum a near unstable suspension in brine of solid particles in the size range of 0.001 to 1 micron selected from the group consisting of carbon black, kaolin and talc and in solution therein a surfactant acting as a dispersant for said particles, the concentration of said particles being in the range of 0.05 to 2 weight percent and the concentration of surfactant being in the range of 0.001 to 2 weight percent, the surfactant to particle weight ratio being one which gives a desired degree of stability to said aqueous suspension of solid particles; and
   driving said aqueous slug with a driving media into said stratum until said surfactant is adsorbed by the stratum in a quantity which results in making the suspension unstable, thus causing precipitation of a substantial portion of the particles from said slug into said stratum to reduce the permeability thereof.

2. The process of claim 1 wherein:
   said solid is carbon black;
   said surfactant is a nonylphenoxy polyethanol having an average chain length on the hydrophilic end in the range of 30 to 100 mols of ethylene oxide; and
   wherein said surfactant to solid particle weight ratio is in the range of 0.25:1 to 0.30:1.

3. The process of claim 1 including the step of injecting an initial aqueous slug containing a surfactant ahead of said particle-containing slug, the concentration of surfactant in and the volume of said initial slug being sufficient to coat the pore walls in said stratum to a desired depth.

4. The process of claim 1 wherein said driving media comprises water, steam, or brine.

References Cited

UNITED STATES PATENTS

| 3,283,812 | 11/1966 | Ahearn et al. | 166—9 |
| 3,289,759 | 12/1966 | Fisher | 166—9 |
| 3,323,589 | 6/1967 | Harvey | 166—9 |
| 3,326,287 | 6/1967 | Corrin | 166—9 |

STEPHEN J. NOVOSAD, *Primary Examiner.*

U.S. Cl. X.R.

166—288, 305